(No Model.)
C. VON DER HEYDE.
VEHICLE WHEEL.
No. 531,311. Patented Dec. 25, 1894.
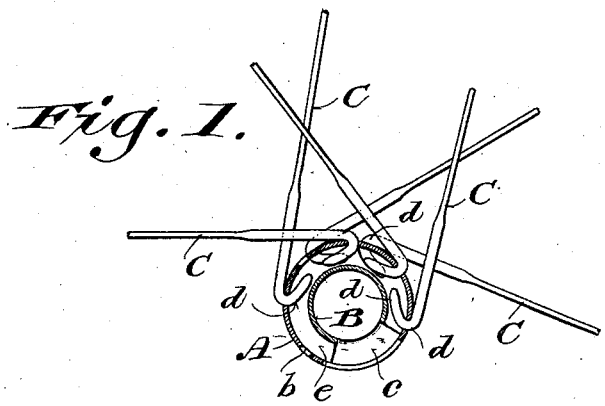
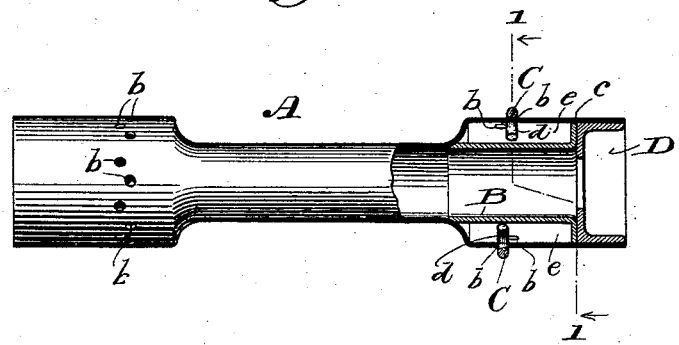
Witnesses:
Geo. W. Young,
N. E. Oliphant
Inventor:
Carl von der Heyde
By H. G. Underwood
C. W. Forney

UNITED STATES PATENT OFFICE.

CARL VON DER HEYDE, OF MILWAUKEE, WISCONSIN, ASSIGNOR TO THE TELEGRAM CYCLE MANUFACTURING COMPANY, OF SAME PLACE.

VEHICLE-WHEEL.

SPECIFICATION forming part of Letters Patent No. 531,311, dated December 25, 1894.

Application filed August 27, 1894. Serial No. 521,410. (No model.)

*To all whom it may concern:*

Be it known that I, CARL VON DER HEYDE, a citizen of the United States, and a resident of Milwaukee, in the county of Milwaukee, and in the State of Wisconsin, have invented certain new and useful Improvements in Vehicle-Wheels; and I do hereby declare that the following is a full, clear, and exact description thereof.

My invention has for its object to improve the construction of wire-spoke vehicle-wheels; and it consists in certain peculiarities of construction and combination of parts hereinafter described with reference to the accompanying drawings and subsequently claimed, whereby I prevent spokes from pulling out of a hub, guard the bearings of the hub from dust entering the spoke openings and in some instances provide seats for ball-cases, the said invention being of especial value in the manufacture of bicycles.

In the drawings: Figure 1 represents a sectional view on line 1—1 of the succeeding figure illustrating a portion of a wire-spoke vehicle-wheel embodying my invention, and Fig. 2 an elevation of the same partly in section.

Referring by letter to the drawings A represents a tubular hub that preferably has its end-portions of greater diameter than the remainder thereof, and as herein shown each end-portion of the hub has two rows of perforations b the perforations in one row breaking joints with those in the other row. A sleeve B having a flange c at its outer extremity is pressed or driven into each end of the hub shown, and hook-shaped inner ends d of wire-spokes C, engaging the aforesaid perforations, occupy the space e intermediate of the sleeve-body and hub. The flange c of each sleeve serves as a seat for a ball-case D, and such being the case the flange or stop-shoulder of the ordinray ball case may be omitted.

As clearly illustrated in Fig. 1, the spokes that engage one row of hub-perforations extend in a direction opposite those engaging the adjacent row, and all of said spokes are at a tangent to the hub.

By having the inner ends of the spokes in the form of hooks, it is apparent that the same may be readily engaged with the hub, and it is also apparent that the sleeves B serve as stops to prevent straightening of the hooks when said spokes are under strain, whereby I insure rigidity of the wheel under all circumstances and make it impossible for the aforesaid spokes to pull out of the hub. It is also evident that dust entering the spoke-openings in the hub cannot get into the bearings because of the sleeves, and this of itself is an important advantage of my invention.

While I have shown a preferred form of hub, any hub embodying two concentric walls spaced apart and the outer one provided with perforations engaged by hook-shaped ends of wire-spokes is within the scope of my invention.

Having thus described my invention, what I claim as new, and desire to secure by Letters Patent, is—

1. A wheel-hub having its end-portions of greater diameter than the remainder thereof, a flanged sleeve contained within each end of the hub, and a series of wire-spokes having hook-shaped inner ends engaging perforations in the end-portions of said hub.

2. A wheel-hub embodying two concentric walls, the outer one of which is provided with perforations in rows those in one row breaking joints with those in the adjacent row, and wire-spokes having hook-shaped ends engaging the perforations, one set of spokes being extended from said hub in a direction opposite to that of the other set.

In testimony that I claim the foregoing I have hereunto set my hand, at Milwaukee, in the county of Milwaukee and State of Wisconsin, in the presence of two witnesses.

CARL VON DER HEYDE.

Witnesses:
N. E. OLIPHANT,
HENRY DANKERT.